United States Patent [19]

Faunce

[11] Patent Number: 5,081,646
[45] Date of Patent: Jan. 14, 1992

[54] EXTENDED-LENGTH PARALLEL CABLE

[76] Inventor: Michael J. Faunce, 136 Oswego Summit, Lake Oswego, Oreg. 97035

[21] Appl. No.: 503,274

[22] Filed: Apr. 3, 1990

[51] Int. Cl.⁵ .......................................... H04L 25/64
[52] U.S. Cl. .......................................... 375/4; 375/36; 375/121
[58] Field of Search ............... 375/36, 4, 121; 370/6; 333/18, 28, 27; 379/390-394; 361/392

[56] References Cited

U.S. PATENT DOCUMENTS

| | | | |
|---|---|---|---|
| 3,543,160 | 11/1970 | Guanella | 375/12 X |
| 4,349,870 | 9/1982 | Shaw et al. | 364/200 |
| 4,360,913 | 11/1985 | Struger et al. | 375/36 X |
| 4,450,555 | 5/1984 | Pays | 370/6 |
| 4,543,450 | 9/1985 | Brandt | 375/36 |
| 4,583,193 | 4/1986 | Kraft et al. | 364/900 |

Primary Examiner—Benedict V. Safourek
Assistant Examiner—Tesfaldet Bocure
Attorney, Agent, or Firm—Chernoff, Vilhauer, McClung & Stenzel

[57] ABSTRACT

An extended-length parallel data communications cable allowing reliable data transmission over extended distances. Each DATA line is low-pass filtered. The STROBE signal is intercepted, delayed to compensate for the DATA lines' decreased slew rate, and shaped for consistent handshaking. The STROBE line is also buffered and filtered. Current limiting resistors are placed in series with the BUSY and ACKNOWLEDGE lines to limit crosstalk between these lines and any other lines. The INITIALIZE line is filtered to further minimize interference and crosstalk. Only those lines necessary for proper communication are supported. The STROBE buffer may be powered by signals available on the ports to which the parallel cable attaches.

1 Claim, 2 Drawing Sheets

EXTENDED-LENGTH PARALLEL CABLE

BACKGROUND OF THE INVENTION

The present invention pertains to parallel communications cables for digital data transmission; such cables, for example, may be used to transmit data between personal computers and printers.

By way of background, parallel communications ports usually comprise as output lines: eight DATA lines, a STROBE line, an INITIALIZE printer line, an automatic LINEFEED line, and a SELECT line; and comprise as input lines: an ACKNOWLEDGE line, a BUSY line, a PAPER OUT line, an ERROR line, and another SELECT line. In standard use, the sending device (typically a computer) places data on the eight DATA lines and waits a short period of time for the DATA lines' logic states, that is, their voltage levels, to settle to their proper values. The sending device then pulses the STROBE line from its usual "high" state to an "active-low" state for a brief period of time, thereby commanding the receiving device (typically a printer) to receive the data present on the DATA lines.

In response to the STROBE pulse, the receiving device sets the BUSY line to a high state, commanding the sending device to wait before changing the DATA lines' states. When the receiving device has received the data, it returns the BUSY line to its normal low state. The sending device may then send more data to the eight DATA lines, repeating the process.

The other output and input lines mentioned above may, or may not, be supported by either the sending device or the receiving device.

Various factors limit a parallel cable's length for reliably linking parallel communication ports. The predominant problem is crosstalk between the DATA lines and into the STROBE line. When crosstalk between the DATA lines and the STROBE line causes the STROBE line to be within the active-low range before the sending device activates the STROBE line, the receiving device will attempt to receive the data before the DATA lines have settled into their proper voltage levels, potentially causing communication errors.

In addition, crosstalk between the DATA lines may prevent some DATA lines from reaching their proper voltage levels before the STROBE line is activated, also causing communication errors. In the worst case, all but one of the DATA lines would simultaneously move from one logic state to the other. The coupling into the remaining DATA line could override its proper state. This crosstalk problem is compounded by a lack of uniformity in STROBE signal timing among different devices.

In general, signal quality degrades as a function of the cable's length. Parallel cables typically are limited in length to approximately 10 to 25 feet; longer lengths have associated signal degradation which prevents reliable communication. Serial cables can operate reliably over much greater lengths. Thus, some earlier extended-length parallel cables are actually serial cables. The parallel signals are converted to a serial stream of data which is transmitted over the extended distance. At the cable's far end, the serial data stream is converted back to parallel signals. This technique of extending the transmission of parallel data has the speed limitations inherent with serial data communication, typically decreasing the transmission speed to approximately one-fifth the speed of parallel transmission.

What is needed, then is an improved parallel communications cable for transmitting data over extended distances while still maintaining signal quality, communications reliability, and parallel data transmission's inherent efficiency and speed advantages over serial data transmission.

SUMMARY OF THE INVENTION

The present invention allows reliable data transfer using parallel communication ports at distances of up to 200 feet, while preserving the speed advantage of parallel communication, solving the above-mentioned problems using a combination of interrelated elements.

A primary feature of the present invention is low-pass filtering of each DATA line, thus preventing crosstalk-inducing high-current surges from passing through the DATA lines. As a significant side-effect of the low-pass filtering, the DATA lines' maximum rate of change between voltage levels, or "slew rate" is decreased.

To compensate for this decrease in slew rate, and as another primary feature of the invention, the STROBE line active-low SIGNAL pulse is intercepted, delayed for a period of time corresponding to the added necessary settling time required by the decreased slew rate, and then transmitted to the receiving device. As an added advantage, the STROBE pulse may be shaped and adjusted in period to provide a consistent timing pattern.

Another primary feature of the invention is buffering of the STROBE line, decreasing its susceptibility to crosstalk induced voltage changes. The input of the STROBE line buffer is filtered to reduce noise susceptibility.

As another feature of the invention, the present invention limits the communication lines to only those necessary to support parallel data transmission and proper device control.

As additional features, resistors are placed in series with the BUSY and ACKNOWLEDGE lines to limit current flow, and thus limit crosstalk between these lines and into other lines. The INITIALIZE line is filtered to further minimize interference and crosstalk. A low-capacitance cable may also be used to extend its usable length.

The STROBE buffer and shaping circuitry may be powered by signals available on the sending and receiving devices' ports to which the parallel cable attaches, obviating the need for an external power supply.

It is therefore a principal object of the present invention to provide a parallel cable which may transmit data over lengths impossible for typical parallel cables.

It is another important object of the present invention to minimize crosstalk between the DATA lines and into the STROBE line.

It is another object to low-pass filter the DATA lines to reduce crosstalk-inducing current spikes.

It is another object to intercept the STROBE signal, delaying and shaping it to provide for consistent handshaking between the sending and receiving devices.

It is another object to buffer the STROBE line to make it less susceptible to interference.

The foregoing and other objectives, features and advantages of the present invention will be more readily understood upon consideration of the following detailed description of the invention taken in conjunction with the accompanying drawings.

DETAILED DESCRIPTION OF THE INVENTION

Figure 1:
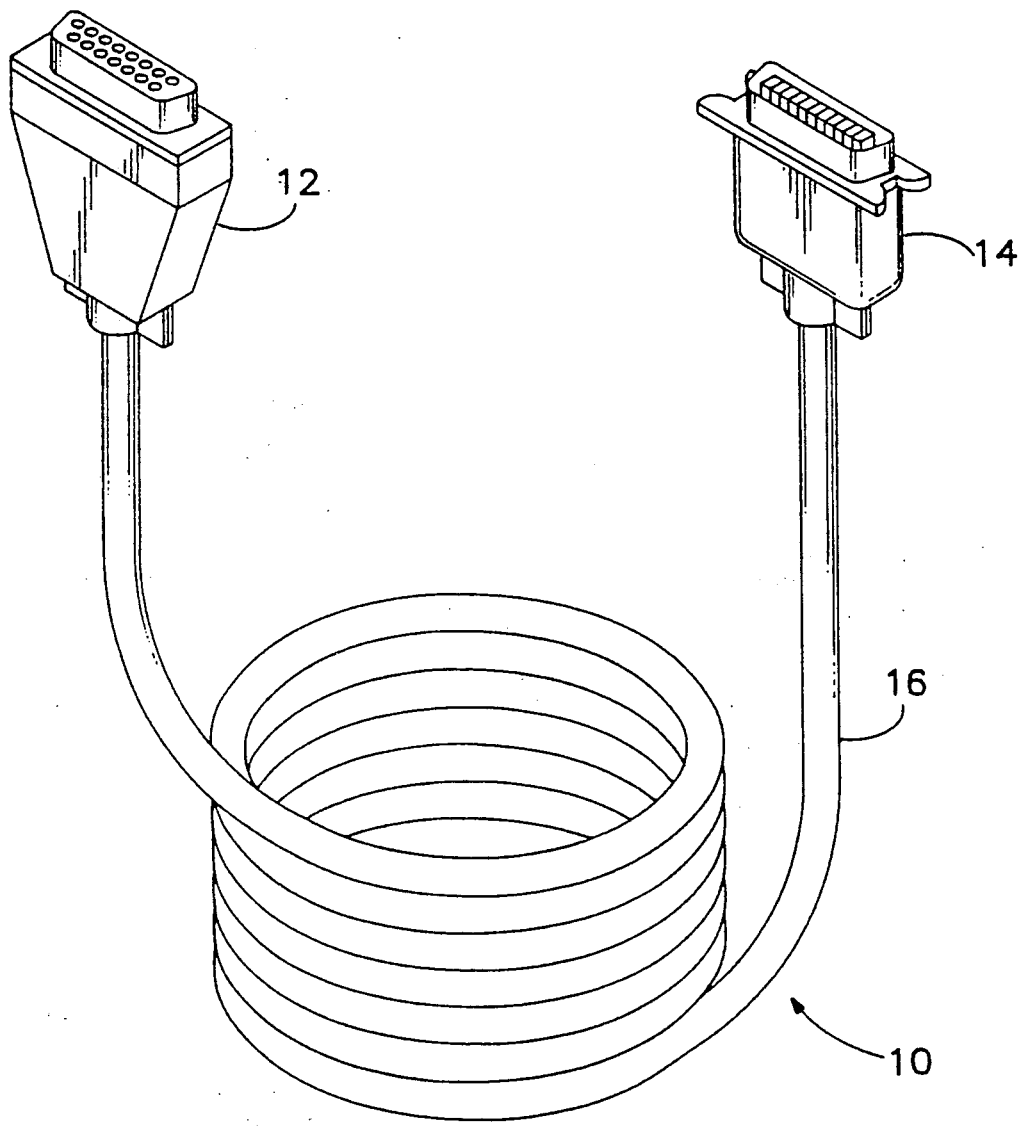
FIG. 1 is a perspective drawing of an exemplary extended-length parallel cable according to the present invention.

Referring now to FIG. 1, an exemplary extended-length parallel cable 10 according to the present invention is shown. The cable comprises a first connector 12 and a second connector 14 joined together with a connecting cable 16 (shown coiled). The first connector is configured to connect to a parallel port on a sending device such as a computer (not shown) and the second connector is configured to connect to a parallel port on a receiving device such as a printer (also not shown). Both the first and second connectors house circuitry enabling the multiple conductor connecting cable 16 to be up to 200 feet in length. Preferably, a low capacitance cable is used for the multiple conductor connecting cable 16.

Figure 2:
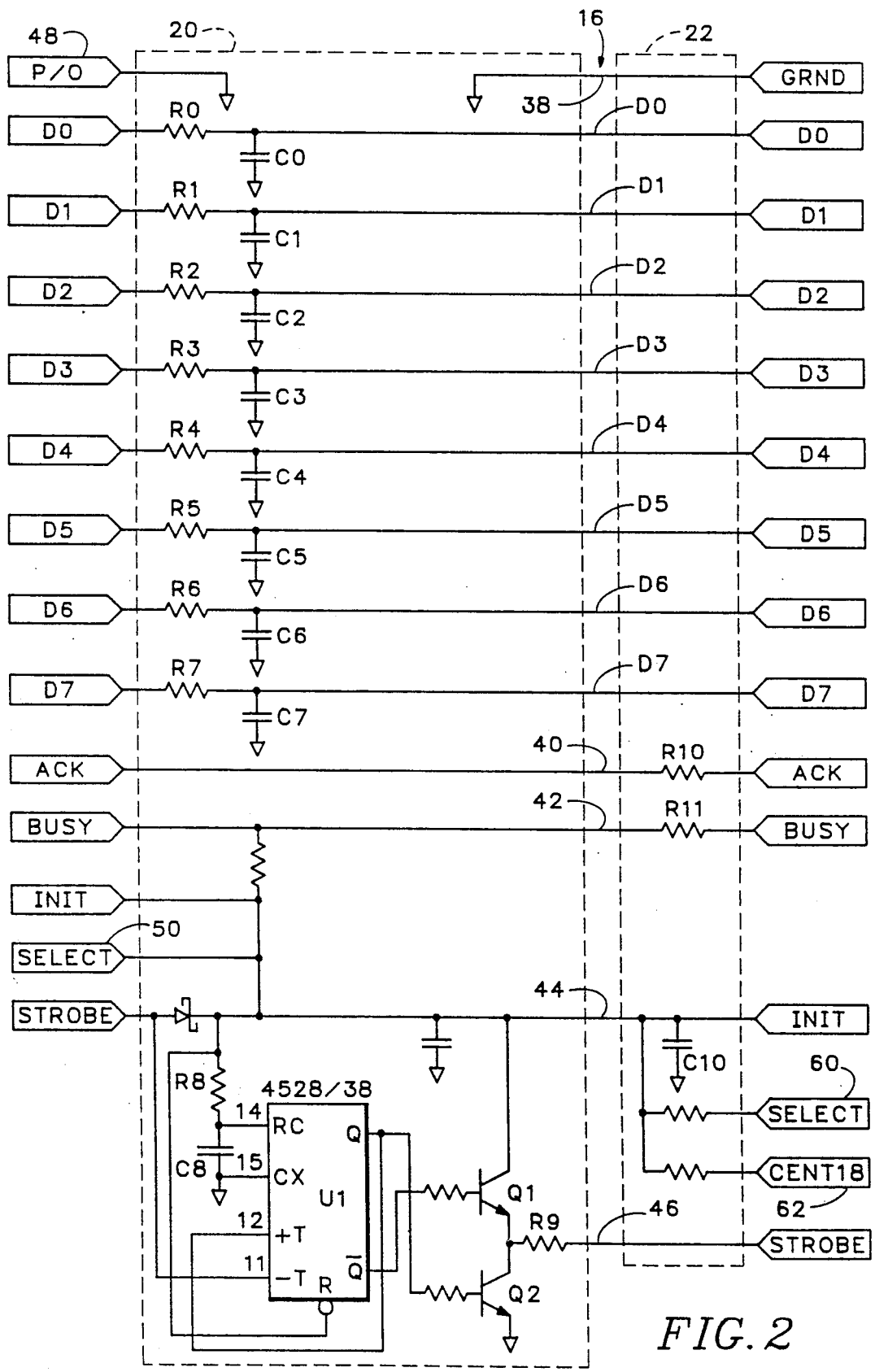
FIG. 2 is a partial schematic diagram of the cable of FIG. 1.

Referring also to FIG. 2, which shows a schematic diagram of an exemplary circuit which embodies the present invention, the portions of circuitry shown within dashed boxes 20 and 22 are housed within the first and second connectors 12 and 14, respectively. The lines between the two dashed boxes 20 and 22 referenced generally as 16 represents the multiple conductor connecting cable 16 shown in FIG. 1.

Each of the DATA lines D0-D7 are low-pass filtered on the sending device side. This filtering minimizes crosstalk-inducing current spikes from traveling along the cable 16. Each filter comprises a resistor, R0-R7, respectively, and a capacitor C0-C7, respectively. Preferably, each of the resistors R0-R7 has a value of 47 ohms, which is suitable to drive a pull-up resistor within the range of 510 ohms to 4.7K ohms. The capacitors C0-C7 preferably each have a value of 0.01 microfarads, providing a rise time of approximately 1 microsecond.

The STROBE line is connected to an input of a flip-flop U1. The flip-flop, in combination with resistor R8 and C8, shapes the STROBE pulse received by the receiving device. Preferably, the flip-flop lengthens the STROBE pulse to a fixed period of eight microseconds starting on the falling edge of the original STROBE signal.

The flip-flop outputs drive a pair of NPN buffer transistors Q1 and Q2. These transistors provide a low-impedance path for both positive and negative STROBE signals, enabling any crosstalk into the STROBE line to be more easily dissipated. One of ordinary skill in the art will recognize other means of buffering the STROBE line may be used. Resistor R9 limits the current through the STROBE line, thereby decreasing any crosstalk effects it may have on other lines in the connecting cable 16.

Not all of the signal pins available in a typical parallel port are supported in the extended-length parallel cable 10. Because each signal line present may be either a source of interference, sensitive to interference, or both, the minimization of signal lines to those required for proper communication minimizes potential interference. A preferred embodiment of the extend length parallel cable supports only the eight DATA lines D0-D7, STROBE 46, ACKNOWLEDGE 40, BUSY 42, INITIALIZE 44, and GROUND 38. The non-supported pins of the parallel ports are effectively disabled, being connected to other lines having the proper logical state for most situations. As shown in FIG. 2, the PAPER OUT pin 48 is connected to GROUND, and the SELECT pin 50 is connected to the INITIALIZE line 44.

Both the BUSY line 42 and the ACKNOWLEDGE line 40 have series resistors R10 and R11 connected in series within the second connector 14. These resistors limit the current through these lines, thereby limiting any crosstalk interference from these lines.

The INITIALIZE line 44 has a capacitor C10 within the second connector 14 reduce its susceptibility to noise.

In a preferred embodiment, the extended-length parallel cable uses no external source of power; instead it uses power from selected lines of the parallel ports of both the sending and receiving devices. The lines selected for sourcing power are those lines which are at a high logic statue during normal printing operations. The INITIALIZE line 44 on the sending device side and the SELECT pin 60 and "pin 18" 62 for CENTRONICS compatible ports on the receiving device side provide power to the flip-flop U1 and the buffer transistors Q1 and Q2. The INITIALIZE line 44 thus performs dual duty, performing both its normal function and acted as a current path for power from the receiving device side.

The terms and expressions which have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims which follow.

What is claimed is:

1. An extended-length parallel communications cable for connecting between a first parallel port of a sending device and a second parallel port of a receiving device, both of said ports including a plurality of DATA lines, and a STROBE line, said cable comprising:
   (a) a first port connector having a multiplicity of input contacts, a first of said input contacts being adapted to connect to said STROBE line of said first parallel port, and a plurality of said input contacts being adapted to connect to said DATA lines of said first parallel port;
   (b) a second port connector having a multiplicity of output contacts, a first of said output contacts being adapted to connect to said STROBE line of said second parallel port, and a plurality of said input contacts being adapted to connect to said DATA lines of said second parallel port;
   (c) a cable having multiple conductors, each of said multiple conductors connecting ones of said input contacts of said first port connector to respective ones of said output contacts of said second port connector;
   (d) a plurality of filtering means interposed between respective ones of said plurality of input contacts of said first port connector and said cable for low-pass filtering of signals received from said first parallel port; and
   (e) strobe shaping means interposed between said first of said input contacts and said cable for receiving a STROBE signal from said STROBE line of said first port and for relaying said STROBE signal to said cable after modifying said STROBE signal.

* * * * *